United States Patent [19]

Dollinger

[11] 4,010,001
[45] Mar. 1, 1977

[54] CARBON BLACK PELLETIZING APPARATUS

[75] Inventor: Robert E. Dollinger, Bedford, Tex.

[73] Assignee: Phillips Petroleum Company, Bartlesville, Okla.

[22] Filed: Oct. 31, 1975

[21] Appl. No.: 627,717

Related U.S. Application Data

[62] Division of Ser. No. 396,815, Sept. 13, 1973, Pat. No. 3,931,377.

[52] U.S. Cl. .............................. 23/252 R; 23/314; 425/222; 264/117; 264/40.6; 259/9; 259/DIG. 22

[51] Int. Cl.² ........................................... B01J 2/00

[58] Field of Search ................... 23/252 R, 314 R; 264/40, 117; 425/222; 137/92; 259/9, DIG. 22

[56] References Cited

UNITED STATES PATENTS

| 2,948,918 | 8/1960 | Austin | 23/314 |
| 3,138,167 | 6/1964 | Fisher | 259/9 X |
| 3,266,874 | 8/1966 | Alleman | 23/314 |

*Primary Examiner*—James H. Tayman, Jr.

[57] ABSTRACT

Apparatus for continuously, controllably passing and mixing carbon black and water together, controllably jetting a plurality of fluid stream against the inner walls of the mixing apparatus, and moving the streams along the inner walls.

2 Claims, 2 Drawing Figures

CARBON BLACK PELLETIZING APPARATUS

This is a divisional application of my copending patent application, Ser. No. 396,815, filed Sept. 13, 1973, now U.S. Pat. No. 3,931,377.

It is desirable to provide an apparatus for producing highly uniform carbon black pellets and preventing undesirable cake buildup within the apparatus.

This invention, therefore, resides in an apparatus for continuously, controllably passing carbon black and an aqueous pelleting liquid stream, for example a water stream, into a mixing chamber, mixing the streams together and controllably jetting a plurality of fluid streams against inner walls of the mixing apparatus and moving the plurality of streams along the inner walls for at least periodically cleaning from the inner walls undesirable wet carbon black cake which forms thereon thereby assuring highly uniform product.

The drawings are diagrammatic views of the apparatus of this invention.

Figure 1:
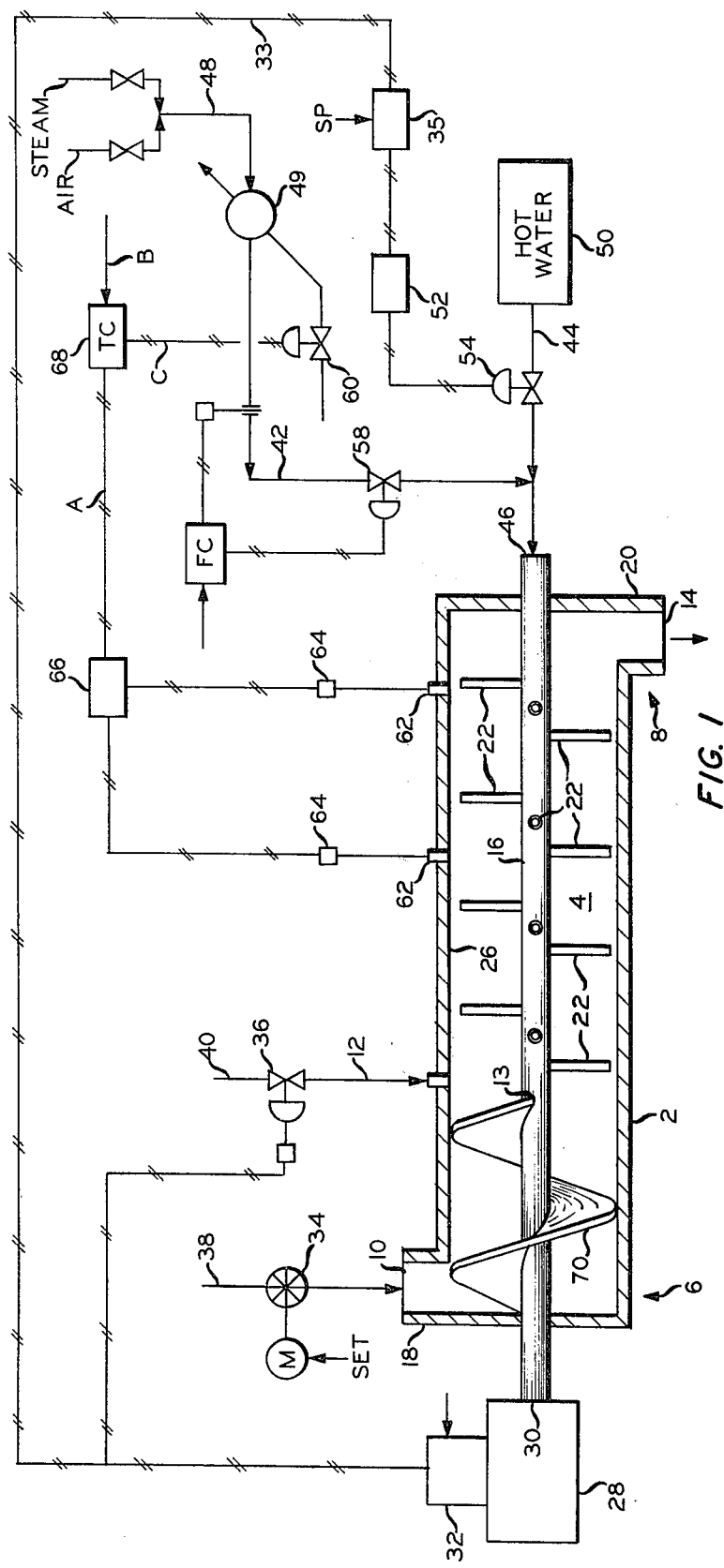
Figure 2:
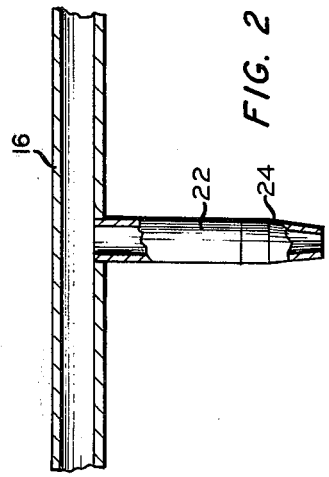

FIG. 1 shows a partial sectional view of the mixing apparatus and example controls of this invention and FIG. 2 shows an enlarged view of the jetting elements of the apparatus.

Referring to FIG. 1, the pelletizer of this invention has a housing 2. The housing 2 has a longitudinal chamber 4 extending therethrough, first and second end portions 6, 8, a carbon black feed inlet 10 and a water or pelleting liquid inlet 12 positioned at the first end portion 6, preferably at or downstream of the downstream end 13 of the screw, and a pellet outlet 14 positioned at the second end portion 8 of the housing 2.

A main conduit 16 extends through the chamber 4 preferably coaxially with said chamber 4 and is rotatably, sealably mounted at the first and second ends 18, 20 of the housing 2.

A plurality of secondary conduits 22 are each connected to and in fluid communication with the main conduit 16 and extend generally radially outwardly from the main conduit 16 along the length thereof. In order to assure uniform action and to produce highly uniform product, it is preferred that the secondary conduits 22 be spaced substantially uniformly along and about the main conduit 16 in a helical configuration. It is further preferred that the secondary conduits 22 be laterally spaced not greater than about 2 inches, preferably in the range of about ½ to 1 inch, one from the other and in the range from about 15° to 40°, preferably about 18° to 25°, arcuately one from an adjacent associated secondary conduit 22.

As shown in FIG. 2, the secondary conduits 22 can have a nozzle 24 attached to the end thereof or be provided with other means such as an orifice or sized for directing a stream of fluid against the inner surface 26 of the housing 2. It is also preferred that the nozzle 24 be removably attached to the secondary conduits 22 in order that they may be replaced when they become worn with accompanying configuration change of the fluid stream discharging therefrom in the operation of the apparatus.

It is further preferred that the secondary conduits 22 and accompanying apparatus be sized in order that the pressure drop across the discharge end thereof can be maintained in the range of about 10 to about 20 psig. At pressures less than about 5 psig the cake may not be desirably removed, and at pressures greater than about 25 psig there may be waste of equipment, power, etc. In order to provide sufficient impact on the walls, the discharge end of the secondary conduits 22 are preferably at a distance from the inner surface 26 of housing 2 in the range of about 1/16 to about ⅛ inch, and expel fluid at velocities greater than about three-fourths of the acoustic velocity of the gas or vapor.

A motor 28, for example an electric motor, is attached to the first end 30 of the main conduit 16 for rotating said conduit and the second conduits 22 along the inner surface 26 of the housing 2 in response to the rotation thereof. As shown in FIG. 1, a motor power (or amperage) sensing element 32 can be operably connected to the motor 28 and to a water control valve 36 which is positioned in water feed line 40 that is attached to its housing inlet 12 for controlling the feed rate of water relative to the rheological character of the mixture within the housing 2. The rate of flow of carbon black 38 is manually set by adjusting the rotating speed of rotary valve 34.

An air or steam conduit 42 and a supplemental fluid conduit 44 are operably connected to the second end 46 of the main conduit 16 for the passage of fluid to the main conduit 16 and secondary conduits 22 and outwardly against the inner surface 26 of the housing 2. The air conduit 42 is connected to a pressurized air-steam conduit 48, preferably carrying wet steam. The supplemental fluid conduit 44 can also be connected to a fluid source such as for example a hot water source 50. It should also be understood that the supplemental fluid stream entering the main conduit 16 can be a fluid mixture and is not necessarily limited to water or steam.

Valves 58, 54 are positioned in the conduits 42, 44 respectively for controllably passing the fluids in a preselected manner.

The drawing shows preferred apparatus for controlling the flow rates of the fluids, but it should be understood that the rates can be manually controlled or by other means known in the art. In the preferred embodiment, a time-programmed controller 52 is operably connected to control valve 54 in a first conduit 44 that is operably connected to the supplemental fluid supply 50 and to the second end 46 of the main conduit 16. Air or steam is passed through a heat exchanger 49, as desired, and to the main conduit 16 via conduits 42 and 44. If cake builds up on the inner surface 26 of the housing 2 to an undesirable thickness, a signal from power sensing element and controller 32 is sent to controller 35, such as a selective relay. When a power or amperage level greater than the set point of controller 35 is reached, a signal is delivered via line 33 to time-programmer controller 52 which causes an additional timed amount of hot water to be injected into the main conduit 16.

A plurality of temperature sensing elements 62 are preferably positioned in the chamber 4 adjacent the inner surface 26 thereof and are positioned at spaced locations along the housing 2 adjacent a secondary conduit 22. Each sensing element 62 is connected to a temperature transmitting element 64. Each temperature transmitting element 64 is connected to an averaging relay 66. The averaging relay 66 receives signals from the temperature transmitting elements 64 that are responsive to the measured temperatures. These signals are averaged and a signal A responsive to said averaged signal is delivered to an average temperature controller 68. The average temperature controller 68 has a set point B and is adapted to compare signal A to the set point B and delivers a signal C. Signal C manipulates the heat input via heat exchanger 49 to control the temperature of air or steam fed to the main conduit 16 via conduit 42. The rate of flow of this stream to main conduit 16 is controlled by a flow control assembly which manipulates valve 58 in conduit 42. The temperature sensing elements 62 can be a single element positioned in the second end 46 of the main conduit 16 where heated fluids are maintained at a temperature about or greater than 212° F. This alternative arrangement, however, does not provide the control obtained with the embodiment shown in FIG. 1 and described above.

In the method of this invention, a stream of carbon black, usually a flocculent carbon black, is continuously passed at a preselected rate into the first end portion 6 of the housing 2 via the carbon black feed line 38. A stream of liquid is continuously passed at a preselected rate relative to the rate of the carbon black stream into the first end portion 6 of the housing 2 into contact with the carbon black via the water feed line 40. The relative rates of delivery of water and carbon black are dependent upon the product desired, but these rates will generally be in the range of about 0.6 to about 2.0 pounds of carbon black per pound of water.

An auger element 70, for example, is affixed to the main conduit 16 and is rotated therewith for compressing the carbon black and moving the mixture from the first end portion 6 toward the second end portion 8 of the housing 2.

Rotation of the main conduit 16 also rotates the secondary conduits 22 for moving jet streams of supplementary fluid discharging therefrom along the inner surface 26 of the housing 2, preferably about perpendicularly thereto. The movement of the secondary conduits 22 causes mixing of the pelleting liquid and carbon black. The jet streams impinge on the inner surface 26 of the housing 2 and prevent a buildup of carbon black between the end of each secondary conduit 22 and the inner surface 26. Unless this cake is prevented from building up, particularly in the area adjacent the secondary conduits 22, said cake will contact secondary conduits 22 with resulting loading of the motor which will undesirably alter the controlled delivery of pelleting liquid with respect to the manual controlled rate of carbon black into the housing, and produce pellets of inferior quality. Delivery of the pelleting liquid into the housing is controlled by the viscosity of the mixture, as determined by motor power or amperage, and cake-secondary conduit contact causes a false indication of viscosity. Cake buildup also alters the consistency of the final product as is shown in the hereafter example.

The rate and volume of the fluid added to the mixture through the secondary conduits 22 is relatively small. Fluid addition downstream of pelleting liquid feed line 40 lowers the retention and mixing time and decreases the uniformity of product. It is, therefore, preferred that the fluid be added intermittently as necessary in an amount sufficient to prevent cake hardening and buildup, but at a volume per hour as low as possible.

It is preferred that the chamber 4 be maintained at a temperature in the range of about 210° to about 212° F, usually about 212° F during the operation thereof for assisting in the prevention of cake buildup. Generally, carbon black enters at about 400° F to 600° F, and pelleting solution at about 150° F.

The temperature of the carbon black-water mixture can therefore be measured at a plurality of locations adjacent the inner surface of the pelletizer. These temperature measurements can then be utilized for controlling the temperature of the plurality of jet streams discharging from the secondary conduits 22 thereby controlling the temperature of the inner surface 26 adjacent secondary conduits 22. These temperature measurements are preferably taken between adjacent jet streams in order to obtain more accurate temperature measurements. Temperature control assists in preventing or minimizing cake buildup for production of pellets of more uniform quality. The temperature of the inner surface 26 should be maintained at a temperature above about 212° F. Preferably the housing 2 is insulated externally so that the temperature within the housing 2 will be maintained at about 212° F which then makes it easier to heat the inner surface 26 to above 212° F by using air and/or steam injection by way of secondary conduits 22.

The temperature measurements or signals responsive to the temperature measurements are averaged and a signal A responsive to the average of said temperatures is delivered from the averaging relay 66 to average temperature controller 68. The average temperature controller 68 compares signal A to a set point B and delivers a signal C. Signal C is delivered to heat exchanger valve 60 which causes the temperature of the air or steam stream to change as necessary to maintain the inner surface 26 at a desired temperature.

During operation, the programmed timer 52 and associated valve 54 cause a hot water stream to be passed through line 44 into the main conduit 16 for a preselected period of time. At the end of that time period, the programmed timer 52 causes valve 54 to close, thereby terminating the water stream. At a preselected period thereafter, the programmed timer will cause the valves to reverse and start a new cycle.

A calculated, illustrative example of the operation and construction of this invention is as follows:

| | | |
|---|---|---|
| (38) | Flocculent Carbon Black, lb./hr. | 2000 |
| (40) | Aqueous Pelleting Solution, lb./hr. (99 wt. % H$_2$O, 1 wt. % molasses) | 2100 |
| | Continuous air rate, cfm at 350° F | 6.17 |
| | Water injection cycle: | |
| |     Water in at 0 min. at 7 lbs. per minute | |
| |     Water out at 0.5 min. | |
| |     Water in at 10 min. at 7 lbs. per minute | |
| | Total Water, 21 lbs./hr. | |
| | (The water 50 is injected 6 times per hour on one-half minute cycles at a rate of 7 lbs. per minute or a total of 21 lbs. per hour) | |
| (14) | Pellet Product, lb./hr. (51.2 wt. % H$_2$O, 48.8 wt. % carbon black) | 4100 |

| Pelleter Apparatus: | |
|---|---|
|     Diameter, inches | 24" |
|     Length, inches | 10' 2" |
|     Auger Length, inches | 2' 1" |
|     Helical Conduit Section length, inches | 8' 1" |
|     Diameter of (16), inches | 6.625" |
|     Diameter of (22), inches | 0.5" |
|     Orifice opening, diameter | 1/64" |
|     Number of conduits (22) | 113 |
|     Arrangement | Double helix |
|     Longitudinal spacings of 22, inches | 0.75" |
|     Angle between successive conduits 22 | 22½° |
|     Temperature, ° F | 350 |

It should be understood that the valves and controls of this invention can be altered from the apparatus as described above whereby mixtures of air and supplemental fluid can be added during the pelletizing operation.

Other modifications and alterations of this invention will become apparent to those skilled in the art from the foregoing discussion, example, and accompanying drawing, and it should be understood that this invention is not to be unduly limited thereto.

What is claimed is:

1. An apparatus for forming carbon black pellets comprising:
   a housing having walls forming a longitudinal chamber extending therethrough, first and second end portions, a carbon black feed inlet and a pelleting fluid inlet positioned at the first end portion, and a pellet outlet positioned at the second end portion;
   a main conduit for a supplemental fluid extending through the chamber and being rotatably mounted through the housing wall, said main conduit being connected to a source of heated supplemental fluid;
   a plurality of secondary conduits extending radially outwardly from the main conduit along the length thereof, said secondary conduits being in fluid communication with the main conduit, terminating a preselected spaced distance from an inner surface of the housing wall and being open ended for discharge of said heated supplemental fluid therefrom;
   means for rotating said main conduit and passing said secondary conduits along said housing wall;
   means for measuring the temperature in said chamber and generating a signal responsive thereto;
   means for controlling the temperature of said heated supplemental fluid responsive to said signal for maintaining the temperature in said chamber in a preselected range; and
   means for moving the carbon black and pelleting fluid through said housing.

2. An apparatus, as set forth in claim 1, wherein there are a plurality of temperature measuring elements positioned along the length of the housing and adapted to measure the temperature within the chamber adjacent the housing walls; and
   an averaging element connected to the temperature measuring element for receiving a signal responsive to the measured temperature, and delivering a control signal responsive to the average of said received signals.

* * * * *